United States Patent
Mosterman et al.

(10) Patent No.: US 9,177,452 B1
(45) Date of Patent: Nov. 3, 2015

(54) USER INTERFACE FOR A MODELING ENVIRONMENT

(75) Inventors: Pieter Mosterman, Framingham, MA (US); Daniel Forrest Higgins, Hopkinton, MA (US); Aditya Agrawal, Needham, MA (US); Simon Greenwold, Newton, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 470 days.

(21) Appl. No.: 13/078,645

(22) Filed: Apr. 1, 2011

(51) Int. Cl.
- *H04B 3/36* (2006.01)
- *G06F 7/00* (2006.01)
- *G06F 17/30* (2006.01)
- *G08B 6/00* (2006.01)
- *G06Q 10/10* (2012.01)
- *G06F 9/44* (2006.01)

(52) U.S. Cl.
CPC .. *G08B 6/00* (2013.01); *G06F 8/10* (2013.01); *G06F 8/34* (2013.01); *G06Q 10/10* (2013.01)

(58) Field of Classification Search
CPC ............. G08B 6/00; G06F 3/016; G06F 8/10; G06F 8/34; G06F 8/30; G06Q 10/10
USPC ................... 340/407.2, 665, 384.1; 320/128; 345/173; 701/211, 200; 707/803, 769, 707/737, 802; 717/126, 106, 104, 109, 105; 703/6, 1
See application file for complete search history.

(56) References Cited

U.S. PATENT DOCUMENTS

| | | | | |
|---|---|---|---|---|
| 8,510,706 B1* | 8/2013 | Bartlett | ...................... | G06F 8/73 717/105 |
| 8,531,451 B2* | 9/2013 | Mital | ....................... | G06F 17/50 345/418 |
| 8,572,504 B1* | 10/2013 | Forstot | ...................... | G06F 8/20 715/764 |
| 8,577,926 B1* | 11/2013 | Cobleigh | ....................... | 707/803 |
| 8,606,375 B2* | 12/2013 | Gahinet et al. | .................. | 700/37 |
| 8,620,635 B2* | 12/2013 | Rubin | ...................... | G06F 17/50 703/2 |
| 8,855,971 B2* | 10/2014 | Orofino, II | ................ | G06F 8/34 703/1 |
| 8,903,688 B1* | 12/2014 | Aldrich | ................. | G06F 17/504 703/6 |

(Continued)

OTHER PUBLICATIONS

"TeslaTouch: Electrovibration for Touch Surfaces", Proceedings of the 2010 ACM Symposium on User Interface Software and Technology, 283-292 (Oct. 3, 2010) available at http://portal.acm.org/citation.cfm?doid=1866029.

*Primary Examiner* — Hoi Lau
(74) *Attorney, Agent, or Firm* — Venable LLP; Michael A. Sartori; Todd R. Farnsworth

(57) ABSTRACT

A computer-implemented modeling system comprising a storage medium, an interface, an output device, and a processor. The storage medium to store executable instructions for providing a modeling environment using the system, the modeling environment supporting model development. The interface to receive an input instruction and create an executable instruction, where the user interaction represents the input instruction and instructs the modeling environment to perform one or more of: an analyzing operation, an editing operation, or a navigating operation. The output device to output at least one of: a tactile output representing tactile feedback, or a haptic output representing haptic feedback; and a processor to execute the executable instructions to provide the modeling environment, process the executable instruction using the modeling environment, and generate an output instruction, where the output instruction is used by an output device for generating the tactile output or the haptic output.

27 Claims, 16 Drawing Sheets

(56) References Cited

U.S. PATENT DOCUMENTS

| | | | |
|---|---|---|---|
| 2005/0137794 A1* | 6/2005 | Cui | 701/211 |
| 2005/0177287 A1* | 8/2005 | Wang et al. | 701/36 |
| 2006/0129976 A1* | 6/2006 | Brand | G06F 8/10 717/109 |
| 2007/0150075 A1* | 6/2007 | Dumas | G06F 8/20 700/29 |
| 2007/0157159 A1* | 7/2007 | Fildebrandt | G06F 8/10 717/104 |
| 2007/0219764 A1* | 9/2007 | Backe | G06F 17/5004 703/6 |
| 2007/0266368 A1* | 11/2007 | Szpak et al. | 717/105 |
| 2008/0059621 A1* | 3/2008 | Raghavan | G06F 8/10 709/223 |
| 2008/0222073 A1* | 9/2008 | Seeger | G06F 8/34 706/48 |
| 2009/0013307 A1* | 1/2009 | Raghavan | G06F 17/5009 717/106 |
| 2009/0113394 A1* | 4/2009 | Weber | G06F 8/10 717/126 |
| 2009/0167508 A1* | 7/2009 | Fadell et al. | 340/407.2 |
| 2009/0179779 A1* | 7/2009 | Katayama et al. | 341/22 |
| 2010/0312364 A1* | 12/2010 | Eryilmaz et al. | 700/30 |
| 2011/0320113 A1* | 12/2011 | Tate, Jr. | 701/200 |
| 2012/0035748 A1* | 2/2012 | Gahinet et al. | 700/31 |
| 2012/0177135 A1* | 7/2012 | Gahinet et al. | 375/260 |

* cited by examiner

USER INTERFACE FOR A MODELING ENVIRONMENT

BACKGROUND INFORMATION

Conventional computer user interfaces may rely heavily on visual output to convey information to a user. Visual output may include displayed text, color, motion, and/or symbols. However, excessive use of visual outputs may easily overload the user interface, especially when there may be a large amount of information being simultaneously displayed to the user. An overloaded user interface may make it difficult for a user to efficiently interpret the type and/or amount of information being conveyed. Conversely, a user interface which displays too little information may require a user to spend a large amount of time searching for important information.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Exemplary embodiments of the invention may convey information to a user visually and via tactile output and/or haptic output. For example, tactile and/or haptic outputs can be used with visual output to increase the amount of information conveyed to a user. Haptic and/or tactile outputs can also be used to present information to users in situations where the information cannot be efficiently provided to the user using visual display techniques. Additionally, while certain information can be visually relayed to a user, it may be more efficient to do so by tactile and/or haptic feedback. For example, tactile and/or haptic feedback may allow the user to send and receive information through the same point of interface (for example, a finger) and/or be more promptly recognized by the user. Additionally, by intuitively conveying information to the user through tactile and/or haptic outputs in addition to visually, a user's efficiency may be improved.

Exemplary System

Figure 1:
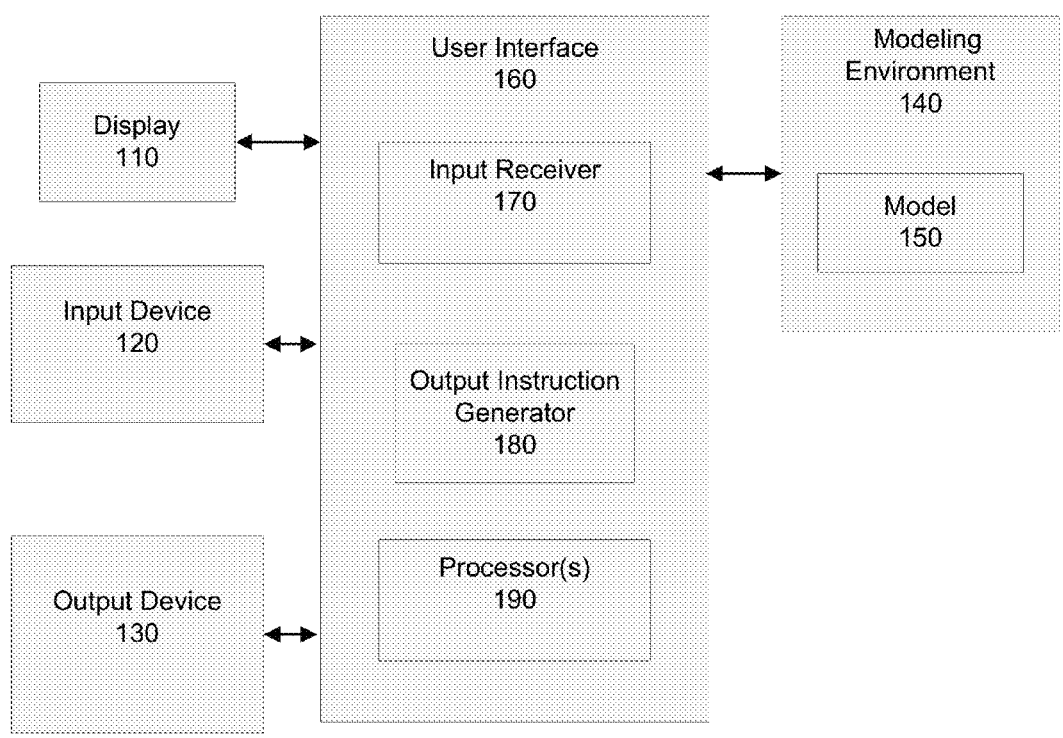
FIG. 1 illustrates an example system that can be configured to provide tactile and/or haptic feedback to a user.

FIG. 1 illustrates an exemplary system 100 that can be configured to provide tactile and/or haptic feedback to a user. System 100 may include display 110, input device 120, haptic and/or tactile output device 130 (hereinafter output device 130), modeling environment 140, and user interface 160. Modeling environment 140 may include model 150. User interface 160 may include user input receiver 170 (hereinafter receiver 170), output instruction generator 180, and processor(s) 190.

Display 110 may display model 150 and/or at least part of modeling environment 140 to user via interface 160. Embodiments of display 110 may include one or more of: a cathode ray tube (CRT), a plasma display, a light-emitting diode (LED) display, a liquid crystal display (LCD), a printer, a vacuum florescent display (VFD), a surface-conduction electron-emitter display (SED), a field emission display (FED), a touch sensitive display, a projector, a screen, etc.

Input device 120 may be any device able to receive one or more input instructions. For example, input device 120 may receive an input instruction(s) from a user, another device, etc. An input instruction(s) may refer to any instruction input to system 100. In an exemplary embodiment, an input instruction(s) may also refer to an interaction a user has with input device 120. Input device 120 may include one or more of: a keyboard, a touch sensitive display, a biometric sensing device, a computer mouse, a trackball, a trackpad, a pen-based pointing device, a joystick, a microphone, etc.

Output device 130 may provide tactile and/or haptic feedback to the user. Output device 130 may include one or more devices that are able to provide tactile and/or haptic feedback to the user. Examples of output device 130 may include one or more of: a heating element able to produce a warm sensation, a cooling element able to produce a cold sensation, a vibration device, a device able to produce an electric shock, etc. Another example of output device 130 may also be a surface which utilizes the principles of electrovibration. Electrovibration enables the creation of a broad range of tactile sensations by controlling electrostatic friction between a surface and a user's finger. Output device 130 may be combined with display 110 and/or input device 120.

Tactile and/or haptic feedback may include tactile and/or haptic output produced by output device 130 in response to, for example, an input instruction(s). Tactile output may refer to the sensation a user feels. Examples of tactile output may include: a viscous sensation, a smooth sensation, a rough sensation, a cold sensation, a cool sensation, a warm sensation, a hot sensation, etc. In an exemplary embodiment, a tactile output may refer to a sensation that resembles the texture of a known material, such as wood, metal, sandpaper, ice, fur, silk, jeans, viscous liquid, non-viscous liquid, etc. Examples of tactile output may also refer to transmission of electrical current, of varying intensity, to a user. For example, a user may feel a mild electric shock when trying to access a restricted file.

Haptic output may refer to the amount of force a user feels. Examples of haptic output may include one or more of: pulsations, vibrations, undulations, etc. caused by, for example, a magnetic, pneumatic, and/or mechanical mechanism. Exemplary pulses may be associated with a variable amount of kinetic energy in order to produce weak pulses or strong pulses.

Modeling environment 140 may include a graphical modeling environment, a textual modeling environment, or a hybrid modeling environment that allows for textual and graphical modeling. Modeling environment 140 may support the development of model 150. In response to an input instruction(s) received by user interface 160, modeling environment 140 may, for example, manipulate model 150, the view of model 150 displayed in display 110, and/or modeling environment 140.

Model 150 may include executable semantics and be implemented in a graphical and/or textual form that can include hybrid graphical and/or textual model elements. Model 150 may be executable. Model 150 may represent a system, such as a dynamic system.

User interface 160 may act as an interface between display 110, input device 120, output device 130, and modeling environment 140. User interface 160 may include receiver 170, output instruction generator 180, and processor(s) 190.

Receiver 170 may receive one or more input instructions from input device 120 and create one or more corresponding executable instructions for modeling environment 140. Modeling environment 140 may then use the executable instructions to create and/or modify model 150 and/or modeling environment 140.

An exemplary receiver 170 may be implemented by user interface 160. In an exemplary embodiment, receiver 170 may create executable instructions for modeling environment 140 by interpreting the meaning of each input instruction(s) with respect to model 150 and/or modeling environment 140 and translating the meaning into executable instructions for modeling environment 140 that can be executed by modeling environment 140.

Output instruction generator 180 may generate one or more output instructions that, when executed by output device 130, produce tactile and/or haptic output. Output instruction generator 180 may also generate one or more output signals that, when received by output device 130, cause output device 130 to produce tactile and/or haptic output. Exemplary output instructions may be created by user interface 160 in response to one or more executable instructions for modeling environment 140, and/or model 150.

Output instruction generator 180 may create and/or modify output instructions in accordance with, for example, one or more default settings of user interface 160 or modeling environment 140. The user may also create and/or modify output instructions in cooperation with output instruction generator 180 through input device 120. For example, a user may create and/or modify output instruction(s) via a graphical element, such as a window, a menu, dropdown list, a radio button, a check box and an icon, provided by modeling environment 140, user interface 160, and/or output instruction generator 180, via input device 120. For a textual modeling environment, the user may create and/or modify output instructions via one or more statements and/or lines of code entered via input device 120.

In an exemplary embodiment, output instructions provided by output instruction generator 180 may enable output device 130 to output a specific tactile and/or haptic feedback in response to a specific input instruction(s) received by receiver 170. This allows system 100 to convey information by establishing a connection between individual input instruction(s) and their corresponding tactile and/or haptic feedback. For example, exemplary tactile and/or haptic feedback output in response to an exemplary input instruction may indicate the presence, in model 150, of an unapplied change, a guideline violation, a warning, an error, a modification date, a frequency of change, restricted access, a measure of complexity (e.g., cyclomatic complexity, a hierarchical depth), a coverage result, a feature (e.g., a nonuniform change), etc. Additional examples of the connection between exemplary tactile and/or haptic feedback and exemplary input instruction(s) are discussed below in connection with FIGS. 4-10.

Processor(s) 190 may be configured to implement all or part of user interface modeling environment 140, model 150, user interface 160, receiver 170, and/or output instruction generator 180. For example, processor(s) 190 may execute executable instructions that provide all or part of user interface modeling environment 140, model 150, user interface 160, receiver 170, and/or output instruction generator 180

System 100 is illustrative and other implementation can take other forms. For example, an alternative implementation of system 100 may have fewer components, more components, or components that differ from the configuration of FIG. 1. For instance, in an alternative embodiment of system 100, display 110, input device 120, output device 130, modeling environment 140, and user interface 160, may be arranged in one or more combined devices. In another embodiment of system 100, display 110 can be arranged in a combined device with input device 120 and/or output device 130. In yet another exemplary embodiment, input device 120 may be arranged in a combined device with display 110 and/or output device 130.

Exemplary Processing

Figure 2:
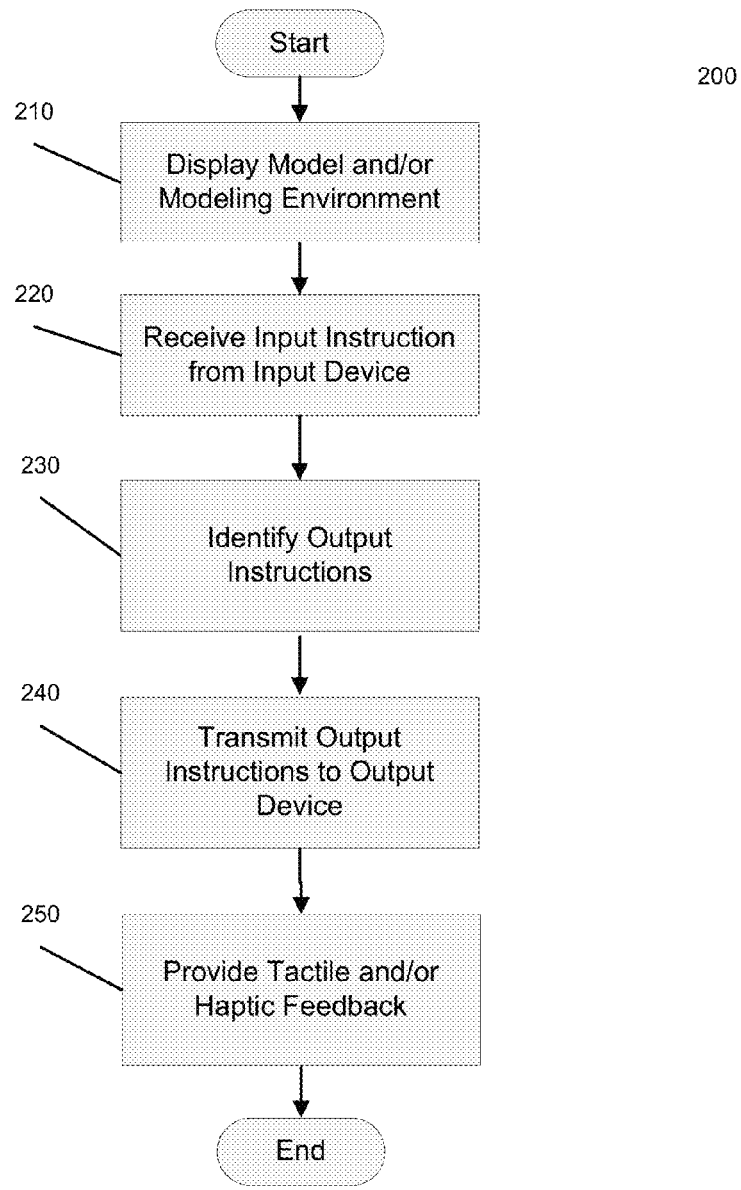
FIG. 2 depicts an exemplary process for providing tactile and/or haptic feedback to a user.

FIG. 2 depicts an exemplary process 200 for providing tactile and/or haptic feedback to a user using output device 130.

Process 200 may begin when display 110 displays at least part of modeling environment 140 and/or model 150 (step 210).

User interface 160 may then receive input instruction(s) from input device 120 (step 220). An input instruction(s) may refer to an interaction between the user and input device 120. Exemplary input instruction(s) may include a user: typing on a keyboard, touching a touch sensitive display, touching a biometric sensor, moving pointer controlled by a computer mouse, moving a pointer controlled by a trackball, touching a trackpad, touching a display with a pen-based pointing device, moving a joystick, speaking into a microphone, etc.

Output instruction generator 180 may then identify an output instruction(s) that corresponds to the received input instruction(s) (step 230).

Once the output instructions have been identified, user interface 160 may transmit the output instruction(s) to output device 130 (step 240).

Output device 130 may then output tactile and/or haptic feedback to the user based on the received output instruction(s) (step 250).

Process 200 may be repeated for subsequent input instruction(s) received by modeling environment 140.

Figure 3:
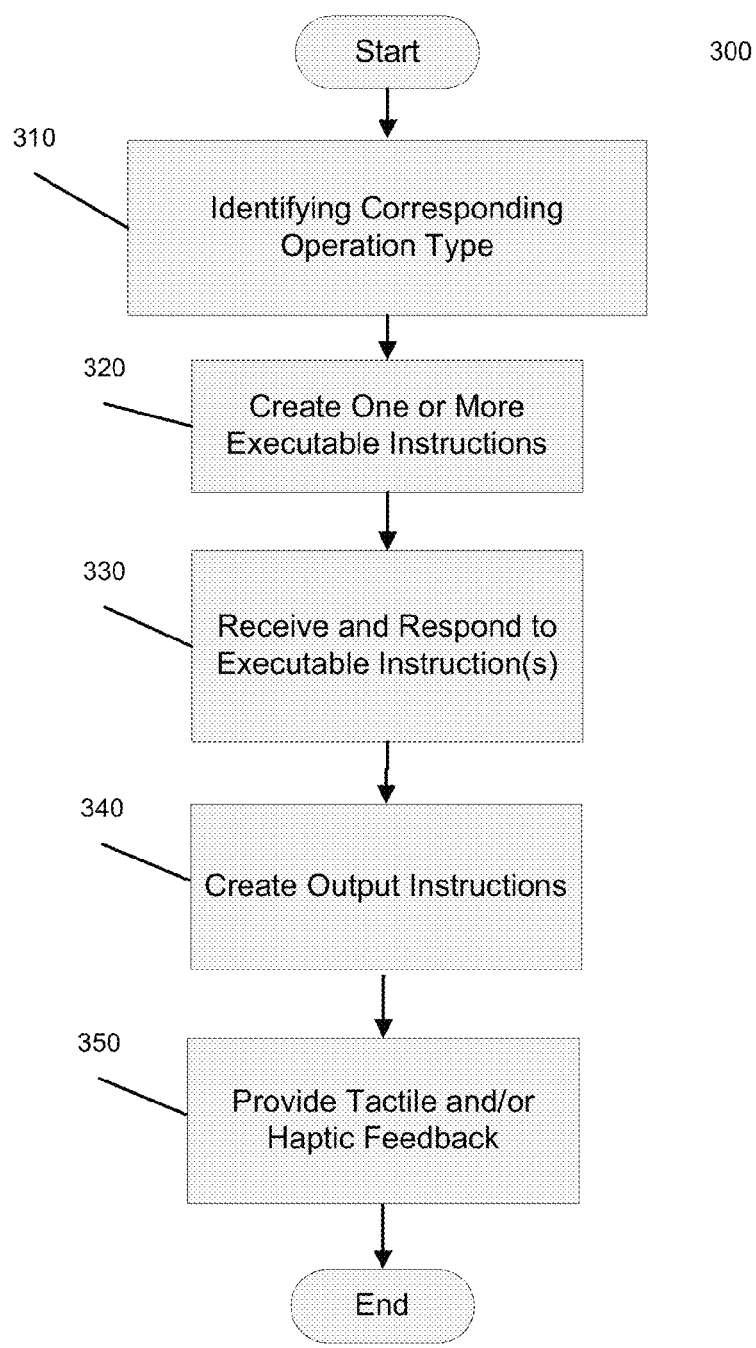
FIG. 3 depicts an exemplary process for identifying output instruction(s) that correspond to received input instruction(s)

FIG. 3 depicts an exemplary process 300 for identifying an output instruction(s) that correspond to the received input instruction(s) (step 230).

Process 300 may begin when receiver 170 identifies the type of operation the received input instruction(s) corresponds with (step 310). An exemplary input instruction(s) may be a part of one or more of a navigating operation, an analyzing operation, or an editing operation. An exemplary input instruction(s) may also include a combination of a navigating operation, an analyzing operation, or an editing operation.

A navigating operation may refer to an input instruction(s) that instruct modeling environment 140 to change the manner in which all or part of modeling environment 140, or properties thereof, are displayed via display 110. A navigating operation may also refer to an input instruction(s) that instruct modeling environment 140 to change the manner in which all or part of model 150, or properties thereof, are displayed via display 110.

An exemplary navigating operations may include an input instruction(s) that instruct modeling environment 140 to perform a pan operation from a first area of model 150 to a second area of model 150, a zoom operation, a change of display of a model portion, a change of hierarchical view of a model, a movement within a dialog box, a movement within a menu, a movement within a dropdown list, etc.

An exemplary navigating operations may also include an input instruction(s) that instruct modeling environment 140 to display a setting for modeling environment 140, display of an option in modeling environment 140, display of an operating mode of the modeling environment 140, or perform any operation which changes how information related to the results of an executed model 150 may be displayed. An operating mode of modeling environment 140 may refer to actions or processes being performed by the modeling environment. For example, operating modes of the modeling environment 140 may include processing instructions, updating model 150, executing model 150, generating a model 150, generating code, compiling code, compiling code contained in model 150, saving model 150, accessing saved information, etc.

An analyzing operation may refer to an input instruction(s) that instruct modeling environment 140 to generate, output, and/or manipulate information related to model 150 or the results of an executed model 150. Exemplary analyzing operations may include an input instruction(s) that instruct modeling environment 140 to execute model 150. An analyzing operation may also refer to an input instruction(s) which instruct modeling environment 140 to display results of an executed model 150. Examples of the displayed results of an executed model may include a trace, a plot, a spline, data, or a data set.

An editing operation may refer to an input instruction(s) that instruct modeling environment 140 to alter modeling environment 140 or model 150. Exemplary editing operations may include an input instruction(s) that instructs modeling environment 140 to: edit a model element(s), align model elements, move a model element(s), copy a model element(s), delete a model element(s), edit modeling environment 140, edit model configuration options, etc.

Receiver 170 may then create one or more executable instructions for modeling environment 140 (step 320). Receiver 170 may create the executable instruction(s) based on the input instruction(s) from input device 120 (see step 220) and the type of operation the received input instruction(s) corresponds with (see step 310).

Once executable instructions have been generated, modeling environment 140 may receive and respond to the executable instructions (step 330). In response to the executable instructions, modeling environment 140 may update model 150 and/or modeling environment 140 itself, execute model 150, manipulate model 150, manipulate a view of model 150 displayed in display 110, manipulate modeling environment 140 itself, retrieve information about modeling environment 140 and/or model 150, etc. For example, in response to exemplary executable instructions, the modeling environment 140 may: determine unspecified data types, sample times, dimensions, etc., of variables (for example by graph propagation or constraint solving); determine dependencies between model elements; determine an evaluation order (e.g., a sorted list, that may be hierarchical) of model elements; evaluate functions that determine parameters; insert functionality such as rate transitions; determine the history of information located in model 140; determine the source of information located in model 140; determine the origins of information located in model 140; determine relationships between model elements; etc.

Output instruction generator 180 may then create one or more output instructions based on the received input instruction(s) and the response of modeling environment 140 to the executable instructions (step 340).

These output instructions may be used by output device 130 to output tactile and/or haptic feedback to the user based on the received output instruction(s) (see step 250). For example, where the modeling environment determined the source of information present in the model 140, the tactile and/or haptic feedback provided by output device 130 may vary depending on the source of the information. For instance, output device 130 may output different tactile and/or haptic feedback in connection with information derived by the modeling environment than it would for information that was defined by the user.

Illustrative Examples of Analyzing Operations

Figure 4:
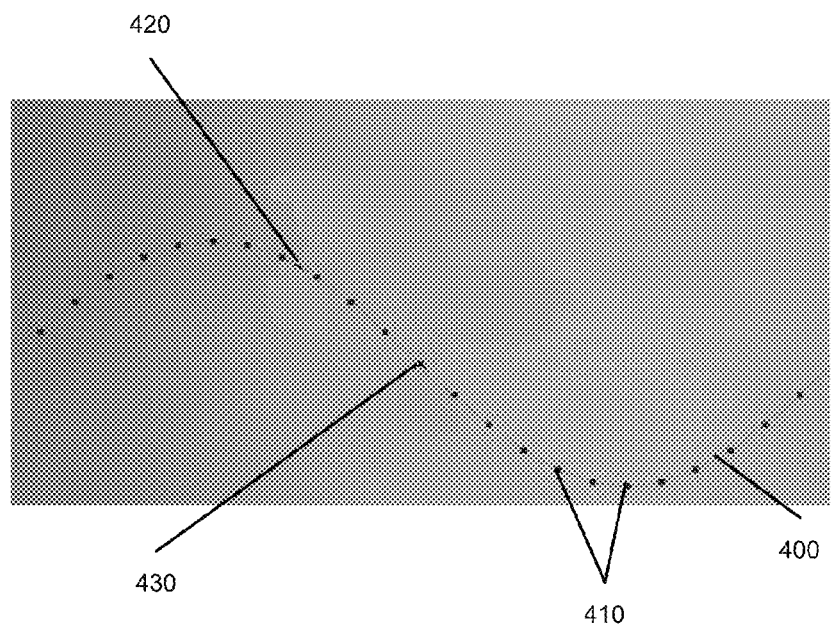
FIG. 4 illustrates an analyzing operation that can be performed on a curve using haptic and/or tactile feedback.

FIG. 4 illustrates an analyzing operation that can be performed on curve 400 using haptic and/or tactile feedback. Curve 400 may, for example, be the result of a spline function performed on data points 410. Curve 400 may be displayed on display 110 while the discrete points are masked within the curve.

System 100 may, in response to input instruction(s) corresponding to an analyzing operation, provide a user with tactile and/or haptic feedback. For example, system 100 may output tactile and/or haptic feedback indicating that a section 420 of the spline includes data points 410 that are not uniformly distributed or a section 430 that contains a high density of data points 410. In FIG. 4, an exemplary input instruction(s) in relation to section 420 may result in output device 130 providing feedback in the form of a viscous sensation (e.g., running a finger through a viscous liquid). In contrast, an input instruction(s) in relation to section 430 may result in feedback in the form of a smooth sensation (e.g., touching silk). In an exemplary embodiment, these sensations may be reversed such that input instruction(s) in relation to section 420 may result in feedback in the form of a smooth sensation while input instruction(s) in relation to section 430 may result in feedback in the form of a viscous sensation.

An exemplary input instruction(s) received in connection with sections 420 and/or 430 may be a user touching a touch sensitive display at sections 420 and/or 430.

Figure 5:
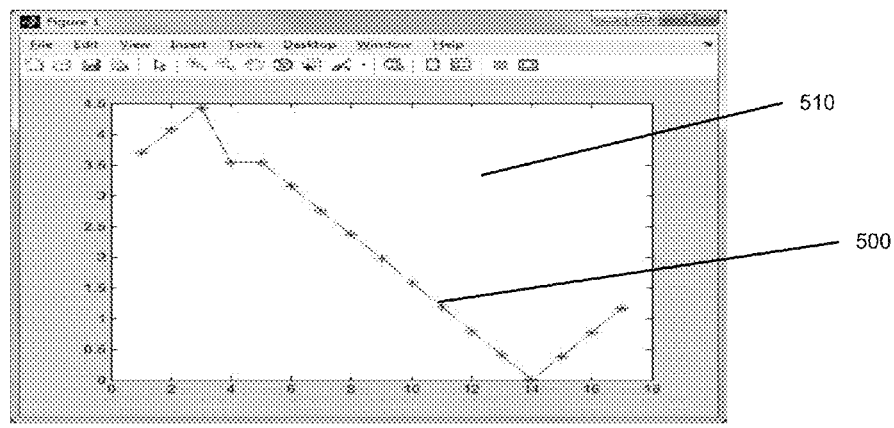
FIG. 5 illustrates an analyzing operation that can be performed on a plot using haptic and/or tactile feedback.

FIG. 5 illustrates an analyzing operation that can be performed on plot 500 using haptic and/or tactile feedback. System 100 may, in response to an input instruction(s) corresponding to an analyzing operation, provide a user with tactile and/or haptic feedback in order to indicate when a new data point has been plotted. In FIG. 5, for example, an input instruction(s) related to area 510 may result in output device 130 providing tactile and/or haptic feedback in the form of an electrical or mechanical pulse when a new data point has been added to plot 500.

An exemplary input instruction(s) received, by input device 120, in connection with area 510 may be a user moving a pointer controlled by a computer mouse anywhere inside of area 510.

Figure 6:
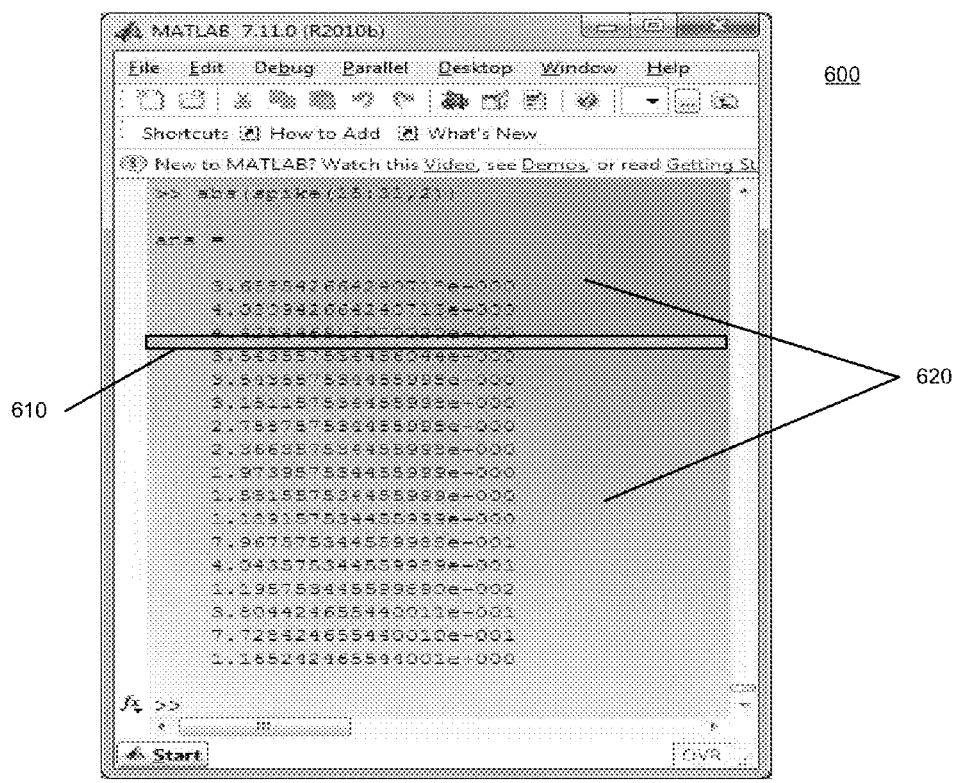
FIG. 6 illustrates an analyzing operation that can be performed on a data set using haptic and/or tactile feedback.

FIG. 6 illustrates an analyzing operation that can be performed on data set 600 using haptic and/or tactile feedback. System 100 may, in response to an input instruction(s) corresponding to an analyzing operation, provide a user with tactile and/or haptic feedback in order to indicate specific points of interest within data set 600. An exemplary point of interest in data set 600 may be the break in continuity between the third and fourth data points, represented by area 610. In FIG.

6, an input instruction(s) related to area 610 may result in feedback that has a different sensation than an input instruction(s) related to other areas 620 within data set 600. For example, an input instruction(s) related to area 610 may result in feedback in the form of a rough sensation (e.g., touching sandpaper). In contrast, the feedback provided in response to an input instruction(s) related to area 620 of data set 600 may be a smooth sensation (e.g., touching silk).

An exemplary input instruction(s) received, by input device 120, in connection with areas 610 and 620 may be a user moving a pointer controlled by a trackball into area 610 and 620.

In another embodiment, exemplary input instruction(s) related to data points in data set 600 may result in feedback that varies depending on the input instruction(s) and the characteristics of the data points. For instance, the resulting feedback may change when the input instruction(s) move between data points with different characteristics. For example, the feedback may change from a semi-smooth sensation (e.g., touching wood) to a rough sensation (e.g., touching sandpaper) when the input instruction(s) change from relating to the fourth data point in data set 600 to relating to the fifth data point, which has a higher value than the fourth data point. Conversely, the feedback may change from a semi-smooth sensation (e.g., touching wood) to a smooth sensation (e.g., touching silk) when the input instruction(s) change from relating to the fifth data point in data set 600 to relating to the fourth data point, which has a lower value than the fifth data point.

An exemplary input instruction(s) received, by input device 120, in connection fourth, fifth, and/or sixth data points within data set 600 may be a user moving a pointer controlled by a trackball over the fourth, and/or fifth data points in dataset 600.

Figure 10:
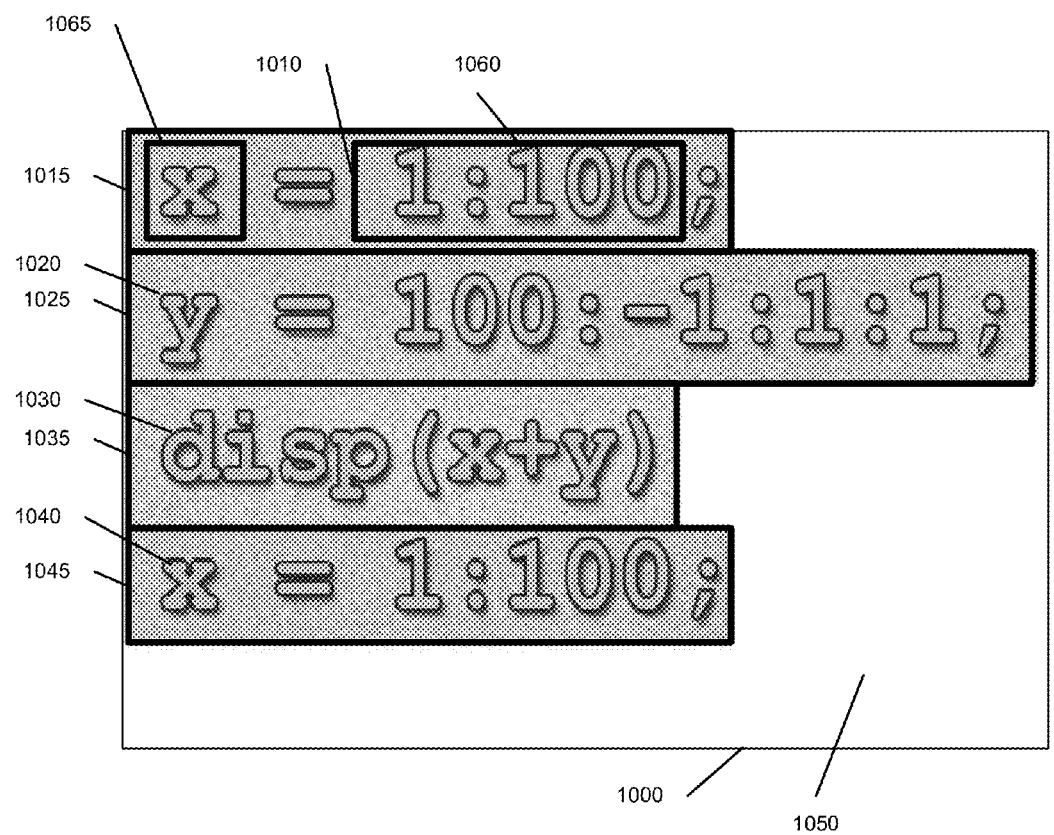
FIG. 10 illustrates operations that can be performed on a textual model using haptic and/or tactile feedback.

FIG. 10 illustrates exemplary analyzing operations that can be performed on textual model 1000 using haptic and/or tactile feedback.

In an illustrative example, the presence recursive code lines in textual mode 1000 may be conveyed to the user via tactile and/or haptic feedback. For example, where lines 1010 and 1040 are recursive, an exemplary input instruction(s) related to areas 1015 and 1045, which surrounds code lines 1010 and 1040, respectively, may result in haptic feedback in the form a vibration.

An exemplary input instruction(s) received, by input device 120, in connection with areas 1015 and 1045 may be a user moving a pointer controlled by a trackball within areas 1015 and 1045.

Illustrative Examples of Model Navigation

Figure 7:
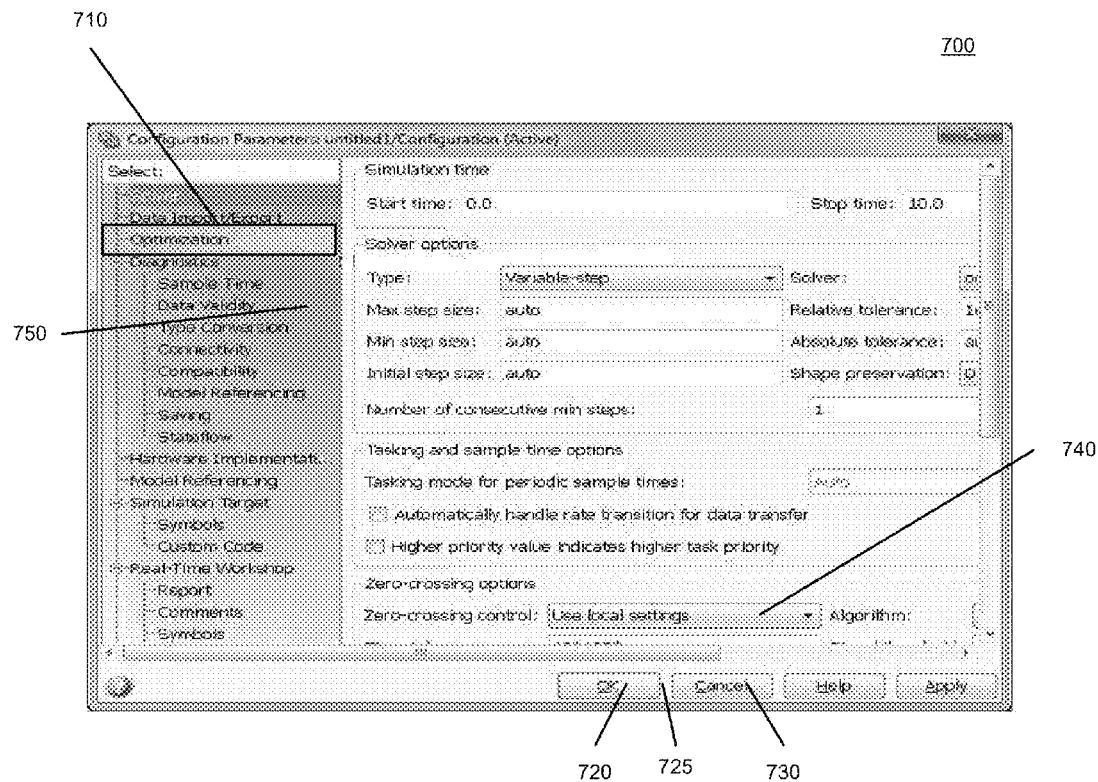
FIG. 7 illustrates a navigation operation that can be performed on an exemplary model configuration dialog box using haptic and/or tactile feedback.

FIG. 7 illustrates a navigation operation that can be performed on an exemplary model 150 configuration dialog box 700 using haptic and/or tactile feedback. Configuration dialog box 700 may be displayed by display 110 and may include elements 720, 730 and dropdown list 740. System 100 may provide an exemplary tactile and/or haptic feedback to the user in response to an exemplary input instruction(s) in relation to the 'Optimization' section, represented by area 710, of dialog box 700. The exemplary tactile and/or haptic feedback may convey information about the contents of the 'Optimization' section. For example, an exemplary input instruction(s) related to an area 710 may result in output device 130 providing tactile and/or haptic feedback that may be different than an exemplary input instruction(s) related to an area 750 outside of area 710. This different tactile and/or haptic feedback may indicate that the 'Optimization' section is in a state that may not be visually communicated, for example, it may include an unapplied change, a recommendation, an incompatibility, a warning, or an error. Exemplary tactile and/or haptic feedback associated with area 710 may also relate to other properties of the 'Optimization' section, such as the time area 710 was last modified.

An exemplary input instruction(s) received by input device 120, in connection with area 710 and area 750 may be a user sliding a finger across a touch sensitive display.

In an illustrative example, the tactile and/or haptic feedback may change as consecutive input instructions change from being related to element 720 to being related to element 730. For instance, a first exemplary input instruction related to element 720 may result in tactile and/or haptic feedback in the form of a smooth and cool sensation (e.g., touching metal having a temperature that is less than a temperature of a user's finger). However a tactile feedback in the form of a rough sensation (e.g., touching sandpaper) may be provided by output device 130 in response to a second exemplary input instruction related to area 725, located in-between elements 720 and 730. Such a sequence of exemplary input instructions related to areas 720 and 725 may occur when a user slides a finger across a touch sensitive display. In another illustrative example, the tactile and/or haptic feedback may change in accordance with the state of options within a dropdown list. For instance, where options available within dropdown list 740 are not set to their default values, input instructions related to dropdown list 740 may result in a tactile feedback in the form of semi-rough sensation (e.g., touching wood).

An exemplary input instruction(s) received by input device 120, in connection with dropdown list 740 may be a user touching a touch sensitive display.

Figure 8B:
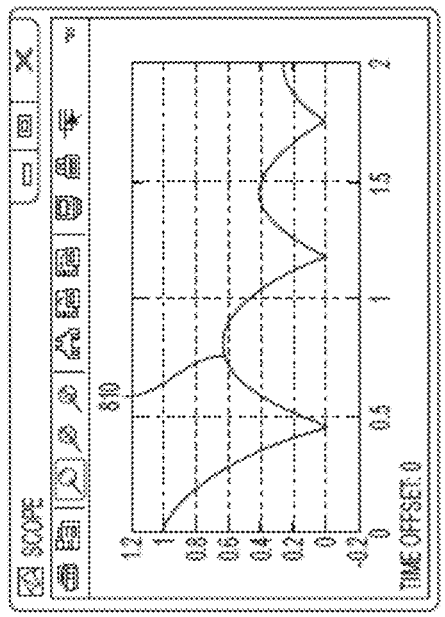
FIGS. 8A and 8B illustrate a navigation operation that can be performed on simulation trace of a bouncing ball using haptic and/or tactile feedback.
Figure 8A:
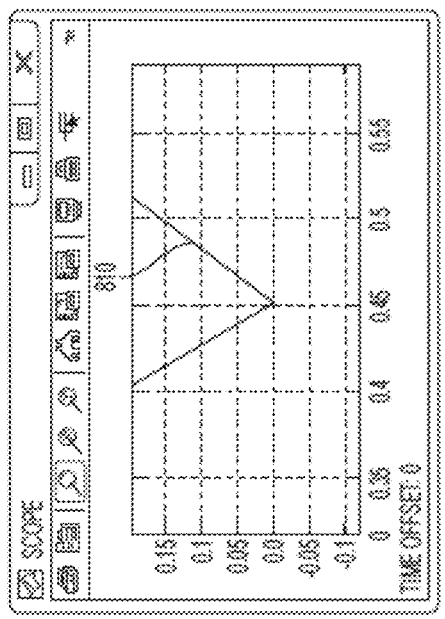

FIGS. 8A and 8B illustrate a navigation operation that can be performed on simulation trace 810 of a bouncing ball using haptic and/or tactile feedback. In FIGS. 8A and 8B, the state of a navigation property, such as a zoom factor, may be indicated by the tactile and/or haptic feedback. For instance, when an exemplary zooming operation is performed, the zoom factor may cause a different mapping of a physically covered area onto a logically represented equivalent. This may cause the same zoom operation may provide a larger or smaller magnification, depending on the current zoom factor.

In FIG. 8A, a zoom operation may be very sensitive (e.g., the zoom factor may be high) such that a zoom operation results in large magnification. The high zoom factor may be relayed to the user via a tactile and/or haptic feedback in the form of a smooth and cold sensation (e.g., touching ice). For example, when a high zoom factor applies, an exemplary input instruction(s) corresponding to a zoom operation related to trace 810 in FIG. 8A may result in output device 130 providing tactile and/or haptic feedback in the form of a smooth and cold sensation (e.g., touching ice).

In FIG. 8B a zoom operation may be less sensitive than the zoom operation performed in FIG. 8A (e.g., the zoom factor may be reduced). The reduced zoom factor may be relayed to the user via a tactile and/or haptic feedback in the form of a semi-rough sensation (e.g., touching wood). For example, when a reduced zoom factor applies, an exemplary input instruction(s) corresponding to a zoom operation related to trace 810 in FIG. 8B may result in output device 130 providing tactile and/or haptic feedback in the form of a semi-rough sensation (e.g., touching wood). Thus, by changing the tactile and/or haptic feedback to match the changing zoom factor, a user may be able to detect the effect of exemplary input instructions. In another embodiment tactile and/or haptic feedback may be provided in the form of a semi-rough sensation (e.g., touching wood) in case of an increased zoom factor. This may allow the user to perform a precise zoom operation even in the case of a very sensitive magnification.

The precision of the operation may be further supported by active haptic feedback (e.g., changing the amount of force a user feels to match the changing zoom factor).

An exemplary input instruction(s) received, by input device 120, corresponding to a zoom operation related to trace 810 may be a user spreading two fingers apart or bringing two fingers together on a touch sensitive display. For example, a pinch motion may be made by a user by touching a multi-point touch interface with two fingers at a given distance and then reducing this distance by moving the finger tips closer to each other. The physical change of distance is translated into a logical magnification such as a change in distance of 1 centimeter corresponds to a logical magnification of a factor 4. The zoom factor may then be 4. If the display changes, the zoom factor may be changed as well. For example, if the user has zoomed in closely on the point at where the bouncing ball reverses its velocity, the zoom factor may be 2 such that a change in distance of 1 centimeter between the finger tips results in a logical magnification of a factor 2.

Figure 9A:
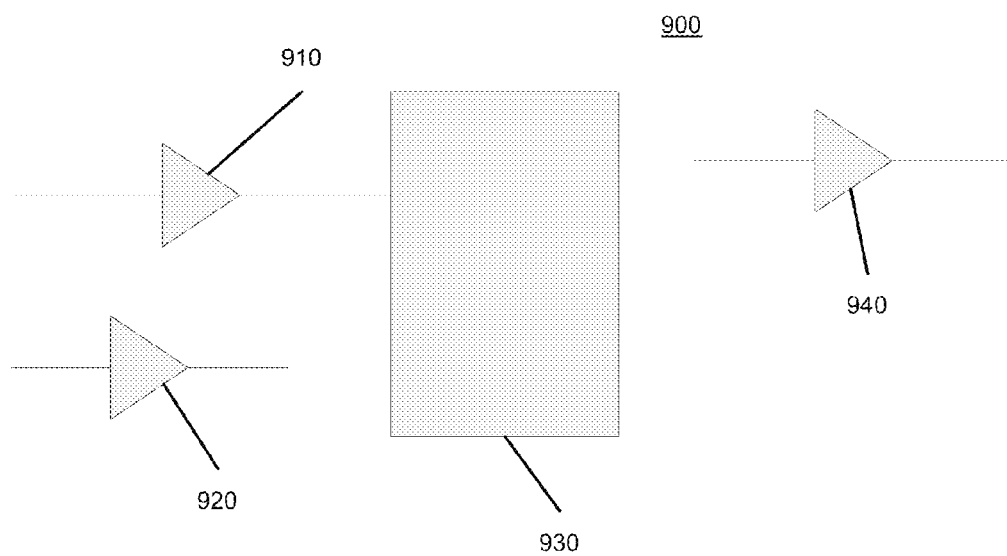
FIG. 9A-9F illustrates operations that can be performed on a graphical model using haptic and/or tactile feedback.

FIG. 9A illustrates a navigation operation that can be performed on graphical model 900 using haptic and/or tactile feedback. Graphical model 900 includes elements 910, 920, 930, and 940.

In an illustrative example, the size of a subsystem hierarchy of, for example, element 930 may be conveyed to the user via tactile and/or haptic feedback. For example, where element 930 includes of a subsystem hierarchy with three or more layers, an exemplary input instruction(s) related to element 930 may result in tactile feedback in the form of a highly viscous sensation (e.g., touching a highly viscous liquid). However, where element 930 includes a subsystem hierarchy including only one or two levels, an exemplary input instruction(s) related to element 930 may result in tactile feedback in the form of a less viscous sensation (e.g., touching a less viscous liquid).

An exemplary input instruction(s) received, by input device 120, in connection with element 930 may be a user moving a pointer controlled by a trackball over element 930.

In another example, the nature of a block or subsystem may be conveyed to the user via tactile and/or haptic feedback. The nature of a block or subsystem may refer to a library subsystem, a variant subsystem with a choice of various content, a configurable subsystem, etc. For example, where element 930 represents a library subsystem, an exemplary input instruction(s) related to element 930 may result in tactile feedback in the form of a rough sensation (e.g., touching wood).

In another exemplary embodiment, recommendations errors and/or warnings in lower level of a subsystem hierarchy may be conveyed to the user via tactile and/or haptic feedback at a subsystem level. For example, if element 930 contains three layers and the second level contains an error, an exemplary input instruction(s) related to element 930 may result in tactile and/or haptic feedback that conveys the presence of recommendations, errors, and/or warnings in the second level of element 930 to the user.

FIG. 10 also illustrates exemplary navigating operations that can be performed on textual model 1000 using haptic and/or tactile feedback. Textual model 1000 includes exemplary lines of code 1010, 1020, 1030, 1040, and whitespace 1050. Whitespace 1050 may refer to an area in the textual model 1000 that do not contain a line of code.

In an illustrative example, the complexity of lines of code 1010, 1020, 1030, and 1040 may be conveyed to the user via tactile and/or haptic feedback. For example, where line 1030 is a complex line of code an exemplary input instruction(s) related to area 1035, which surrounds line 1030, may result in tactile feedback in the form of a highly viscous sensation (e.g., touching a highly viscous liquid). However, where lines 1010, 1020, and 1040 are not complex lines of code, an exemplary input instruction(s) related to areas 1015, 1025, and/or 1045, which surround lines 1010, 1020, and 1040, respectively, may result in tactile feedback in the form of a non-viscous sensation (e.g., touching a non-viscous liquid).

An exemplary input instruction(s) received, by input device 120, in connection with areas 1015, 1025, 1035, and/or 1045 may be a user moving a pointer controlled by a computer mouse within areas 1015, 1025, 1035, and/or 1045.

In another illustrative example, differences between displayed textual model 1000 and a saved version of textual model 1000 may be conveyed to the user via tactile and/or haptic feedback. A saved version of textual model 1000 may be located, for example, in a source control and/or on a computer-readable medium. For example, where line 1030 has been added to the displayed textual model 1000 but is not located in the saved version of the textual mode, an exemplary input instruction(s) related to area 1035, which surrounds lines 1030, may result in tactile feedback in the form of a rough and/or hot sensation (e.g., touching hot sandpaper). However, where line 1010 is located in both the displayed and saved versions of textual model 1000, an exemplary input instruction(s) related to areas 1015, which surround line 1010, may result in tactile feedback in the form of a smooth and/or cold sensation (e.g., touching ice).

An exemplary input instruction(s) received, by input device 120, in connection with areas 1015 and 1035 may be a user selecting areas 1015 and 1035 with a pen-based pointing device.

In another illustrative example, information about the revision history of model elements (e.g., the frequency and/or history of change) may be conveyed to the user via tactile and/or haptic feedback. For example, system 100 may contain or obtain at least part of the revision history of a model. Using the revision history, it may be determined that a given model element, such as line 1020, has been changed more frequently than another model element, such as line 1030. An exemplary input instruction(s) related line 1020 may result in tactile feedback in the form of a rough and/or hot sensation (e.g., touching hot sandpaper) while an exemplary input instruction(s) related to line 1030 may result in tactile feedback in the form of a smooth and/or cold sensation (e.g., touching ice).

In yet another illustrative example, errors and/or warnings associated with code lines 1010, 1020, 1030, and 1040 may be conveyed to the user via tactile and/or haptic feedback. An error may be the result of, for example, a syntax error or a programming and/or modeling guideline (e.g., lint, Motor Industry Software Reliability Association [MISRA] coding guidelines, MathWorks Automotive Advisory Board [MAAB] modeling style guidelines, etc.) error. For example, where line 1020 contains a syntax error, an exemplary input instruction(s) related to area 1025, which surrounds lines 1020, may result in haptic feedback in the form of one or more pulsations. However, where line 1010 may not contain an error but may merit a warning, an exemplary input instruction(s) related to areas 1015, which surround line 1010, may result in haptic feedback in the form of a vibration.

An exemplary input instruction(s) received, by input device 120, in connection with areas 1015 and 1025 may be a user moving a pointer controlled by a joystick within areas 1015 and 1035.

In another exemplary embodiment, the errors and/or warnings may be in referenced code. For example, the function called in line 1030 may have internal errors and/or warnings. This information may be conveyed to the user via tactile and/or haptic feedback in response to an exemplary input instruction(s) related to area 1035, which surrounds lines 1030.

In another exemplary embodiment, recommendations, errors and/or warnings may be at a hierarchical level of a graphical model that is referenced by a model element in the graphical model. This model element may convey the presence of recommendations, errors and/or warnings at a referenced hierarchical level to the user via tactile and/or haptic feedback. For example, a subsystem in a time based block diagram may represent a number of connected blocks at a lower level in the hierarchy. Recommendations, errors and/or warnings in the lower level may be conveyed to the user via tactile and/or haptic feedback at the level in the hierarchy where the subsystem is located.

In another illustrative example, the operating mode of modeling environment 140, which contains textual model 1000, may be conveyed to the user via tactile and/or haptic feedback. For example, when modeling environment 140 is compiling lines 1010, 1020, 1030, and 1040 in textual model 1000, an exemplary input instruction(s) related to textual model 1000 may result in tactile feedback in the form of a rough and/or hot sensation (e.g., touching hot sandpaper).

An exemplary input instruction(s) received, by input device 120, in connection with textual model 1000 may be a user touching any part of textual model 1000 on a touch sensitive display.

In another exemplary embodiment, the size of a variable such as an array in an array-based language may be conveyed to the user via tactile and/or haptic feedback. For example, where the dimension of the values '1' and '100' in '1:100' on code line 1010 is size 1, an exemplary input instruction(s) related to area 1060, which surrounds '1:100', may result in tactile feedback in the form of a viscous sensation (e.g., touching a highly viscous liquid). However, where variable 'x' on code line 1010 is of size 100, an exemplary input instruction(s) related to area 1065, which surrounds variable 'x', may result in tactile feedback in the form of a viscous sensation greater than that associated with area 1060 (e.g., touching a more viscous liquid).

An exemplary input instruction(s) received, by input device 120, in connection with areas 1060 and 1065 may be a user touching any areas 1060 and 1065 on a touch sensitive display.

Illustrative Examples of Editing Operation

Figure 9B:
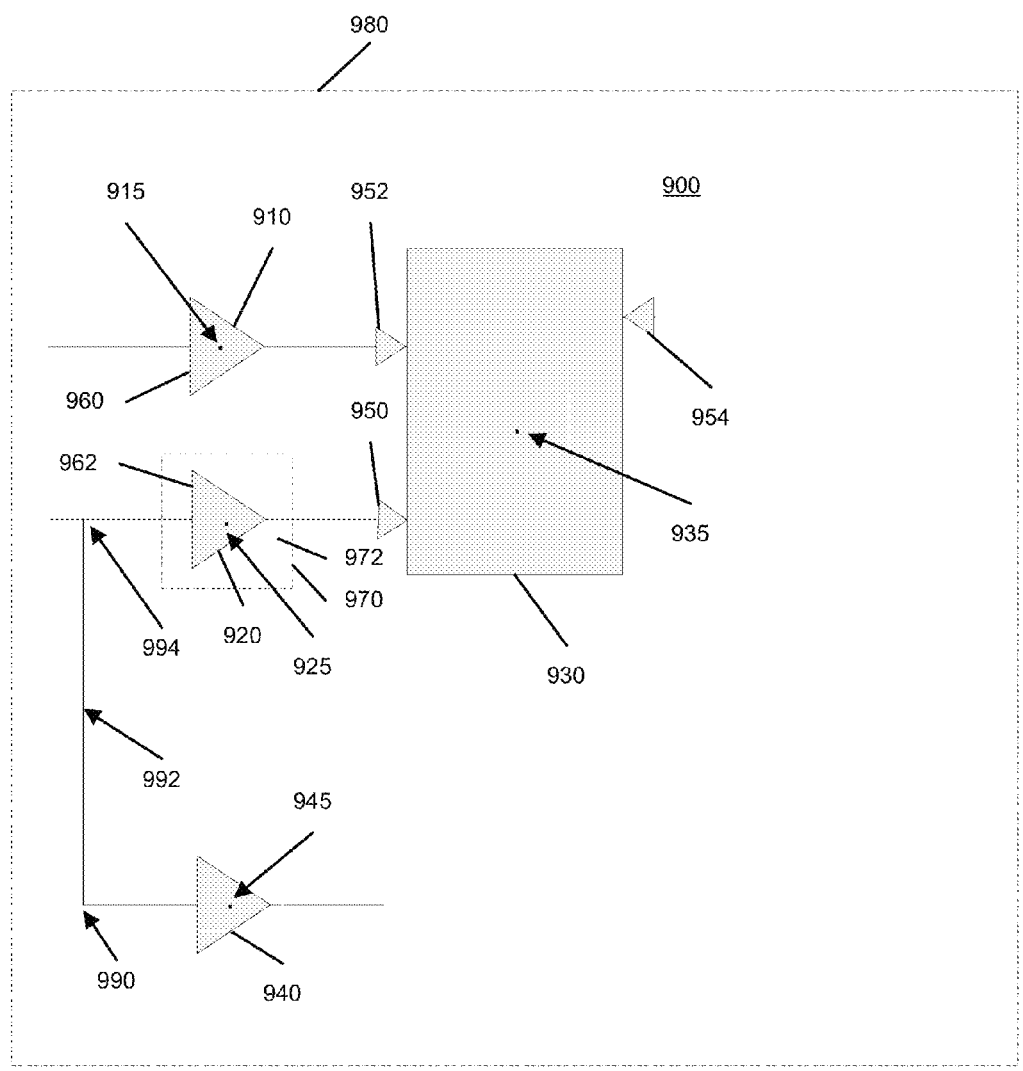

FIG. 9B illustrates an editing operation that can be performed on graphical model 900 using haptic and/or tactile feedback. In an illustrative example, exemplary input instruction(s) aligning elements in model 900 may result in tactile and/or haptic feedback. For instance, when, in response to exemplary input instruction(s), previously unaligned model elements are moved into alignment or are close to achieving alignment, the resulting tactile and/or haptic feedback may change from, for example, a smooth sensation to a rough sensation. This type of active feedback may help the user in positioning a model element in a precise location.

Model element alignment may be determined based on a model element interface, model element geometry, and/or line features. An example of a model element interface may be input port locations 950 and 952, and output port location 954. Examples of model element geometry may include the location of one or more edges of a model element icon (such as edges 960, 962), location of one or more edges of a model element bounding box (such as edge 970 of bounding box 972), and the location of a model element center point (such as center points 915, 925, 935, and 945). Examples of line features may include the location of a line segment, the location of a corner point in a line, the location of a connection point in a line, and the location of a branch point in a line.

In an illustrative example, exemplary input instruction(s) aligning element 920 with element 930, based on port 950, may result in tactile feedback in the form of a rough sensation (e.g., touching sandpaper). An exemplary input instruction(s) received, by input device 120, aligning element 920 with element 930 may be a user moving element 920 by moving a finger across a touch sensitive display.

In another illustrative example, exemplary input instruction(s) which relate to properties of model canvas 980 may result in tactile and/or haptic feedback. Model canvas 980 may refer to the area in which a model 900 and/or model elements 910, 920, 930, and 940 may be created. Model canvas 980 may be provided by the modeling environment 140. All or part of the model canvas 980 may be displayed on display 110 in a window. For example, when a move operation results in a model element being close to the boundary of model canvas 980 or being out of the visible view of model canvas 980, a tactile feedback in the form of a rough sensation may result.

In another illustrative example, exemplary input instruction(s) moving elements in a model may result in tactile and/or haptic feedback that varies. The tactile and/or haptic feedback may vary, for example, depending on the number of model elements involved in a move operation. For example, when model elements 910 and 920 are involved in a simultaneous move operation, a tactile and/or haptic feedback in the form of a semi-viscous sensation may result. When, for example, elements 910, 920, 930, and 940 are involved in a simultaneous move operation, a tactile and/or haptic feedback in the form of a more viscous sensation may result as compared to the resulting feedback when only elements 910 and 920 are involved in the move operation.

Figure 9C:
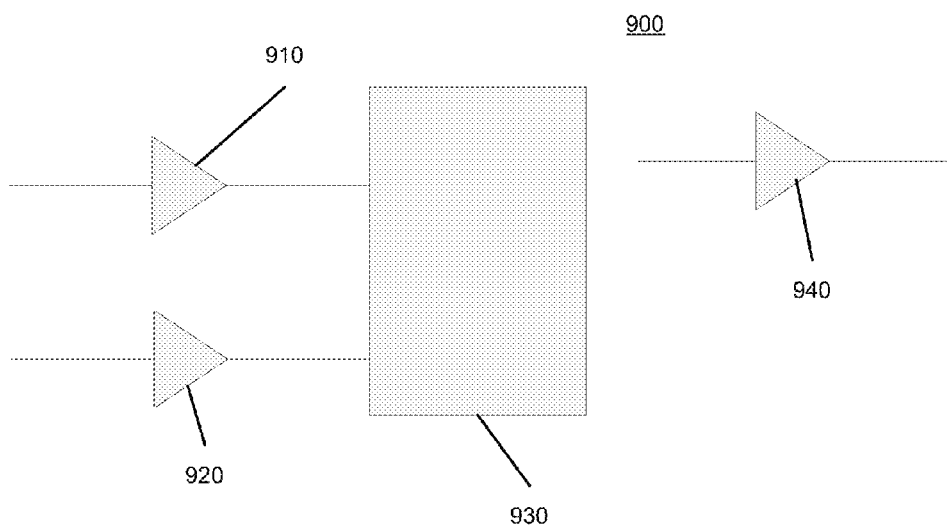

FIG. 9C illustrates an editing operation that can be performed on graphical model 900 using haptic and/or tactile feedback. In an illustrative example, an exemplary input instruction(s) moving element 940 into proximity with element 930 may result in a tactile feedback in the form of a smooth sensation (e.g., touching silk) while element 940 is being moved and a haptic feedback in the form of a mechanical pulse when element 940 is in proximity to element 930.

An exemplary input instruction(s) received, by input device 120, in connection with moving element 930 may be a user touching element 930 with a finger and then sliding the finger across a touch sensitive display.

Figure 9D:
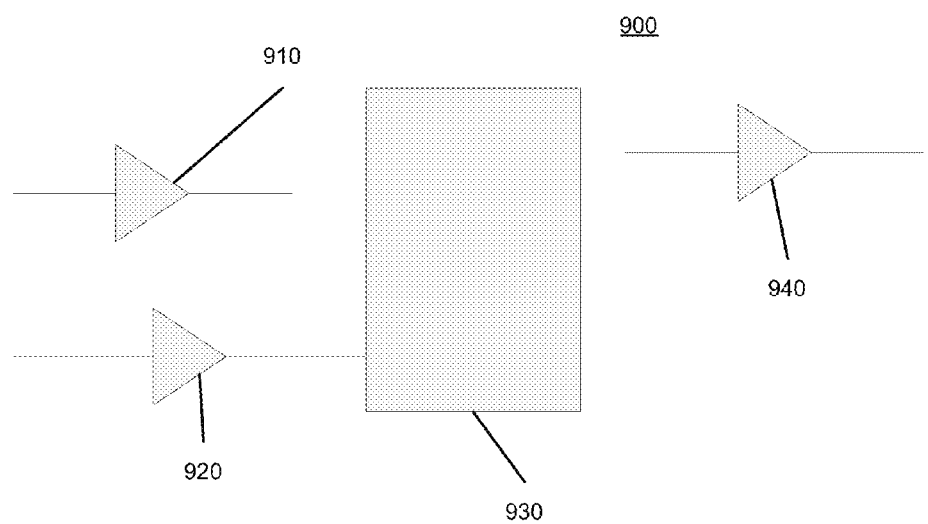

FIG. 9D illustrates an editing operation that can be performed on graphical model 900 using haptic and/or tactile feedback. In an illustrative example, an exemplary input instruction(s) which changes the relationship between element 910 and element 930 in FIG. 9 may result in a tactile and/or haptic feedback. For example, when an exemplary input instruction(s) disconnects element 910 from element 930, a tactile feedback in the form of an electric pulse may result indicating the meaning of element 910 has changed.

Exemplary input instruction(s) received, by input device 120, that changes the relationship between elements 910 and 930 may be a user disconnecting element 910 from element 930 with a pointer controlled by a trackball.

Figure 9E:
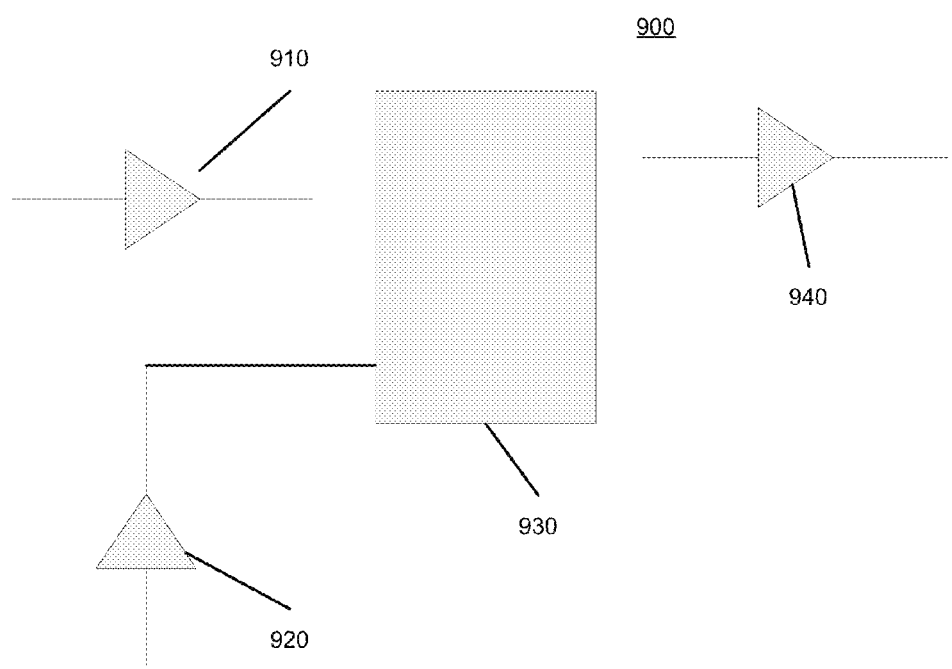

FIG. 9E illustrates an editing operation that can be performed on graphical model 900 using haptic and/or tactile feedback. In another exemplary embodiment, a particular tactile and/or haptic feedback may indicate that an operation has ended. For example, an exemplary input instruction(s) which moves element 920 may result in a tactile feedback in the form of a smooth and cool sensation (e.g., touching metal). However, if the move operation is aborted, a tactile feedback in the form of an electric pulse may result. The drag operation may be aborted due to, for example, an invalid input instruction(s) (e.g., a user's finger being stationary where the operation cannot be completed for a set amount of time). If the drag operation is completed, a tactile feedback in the form of a viscous sensation (e.g., running a finger through a viscous liquid) may result. Completion of the drag operation may be completed due to, for example, a valid input instruction(s) (e.g., a user's finger being stationary where the operation can be completed for a set amount of time) and the haptic and/or tactile feedback may indicate the completion status to the user.

Exemplary input instruction(s) received, by input device 120, editing element 920 may be a user touching element 920 on a touch sensitive display and then sliding the finger across the touch sensitive display.

Figure 9F:
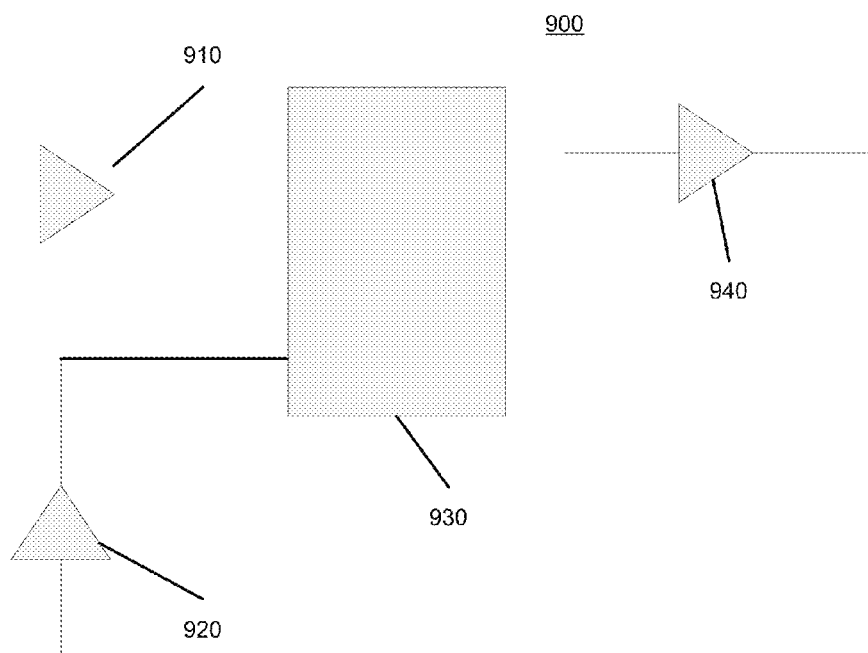

FIG. 9F illustrates an editing operation that can be performed on graphical model 900 using haptic and/or tactile feedback. In exemplary embodiment, an exemplary input instruction(s) which gains control of an element in FIG. 9F may result in a tactile and/or haptic feedback. For instance, when an exemplary input instruction(s) results in a user gaining control of element 910, a tactile feedback in the form of a mechanical pulse may result to indicate to the user that the user now has control of element 910.

An exemplary input instruction(s) received, by input device 120, gaining control of element 910 may be a user using a computer controlled mouse to continuously selecting element 910 for a predetermined length of time (e.g., 2 seconds).

FIG. 10 also illustrates exemplary editing operations that can be performed on textual model 1000 using haptic and/or tactile feedback.

In an illustrative example, the presence or absence of code in textual mode 1000 may be conveyed to the user via tactile and/or haptic feedback. For example, an exemplary input instruction(s) related to areas 1015, 1025, 1035, and 1045, which surrounds code lines 1010, 1020, 1030, and 1040, may result in tactile feedback in the form of a rough sensation (e.g., touching sandpaper). However, an exemplary input instruction(s) related to whitespace 1050, which does not contain any code, may result in tactile feedback in the form of a smooth sensation (e.g., touching silk).

An exemplary input instruction(s) received, by input device 120, in connection with areas 1015, 1025, 1035, 1045, and/or whitespace 1050 may be a user selecting areas 1015, 1025, 1035, 1045, and/or whitespace 1050 via a keyboard.

In an illustrative example, the status of lines of code 1010, 1020, 1030, and 1040 may be conveyed to the user via tactile and/or haptic feedback. For example, where line 1040 has a read-only status, and may not be edited, an exemplary input instruction(s) related to area 1045, which surrounds line 1040, may result in tactile feedback in the form of a cold sensation (e.g., touching a surface having a temperature that is less than a temperature of a user's finger).

An exemplary input instruction(s) received, by input device 120, in connection with areas 1045 may be a user touching area 1045 on a biometric sensitive device.

In an illustrative example, the amount of revisions to lines of code 1010, 1020, 1030, and 1040 may be conveyed to the user via tactile and/or haptic feedback. For example, where line 1010 has been revised twice, an exemplary input instruction(s) related to area 1015, which surrounds line 1010, may result in tactile feedback in the form of a cold sensation of touching a semi-rough surface (e.g., touching wood). However, where line 1030 has been revised ten times, an exemplary input instruction(s) related to area 1035, which surround line 1030, respectively, may result in tactile feedback in the form of a sensation of touching an extremely rough surface (e.g., course sandpaper).

An exemplary input instruction(s) received, by input device 120, in connection with areas 1015 and/or 1035 may be a user moving a pointer controlled by a trackball within areas 1015 and/or 1035.

Example Distributed System

Figure 11:
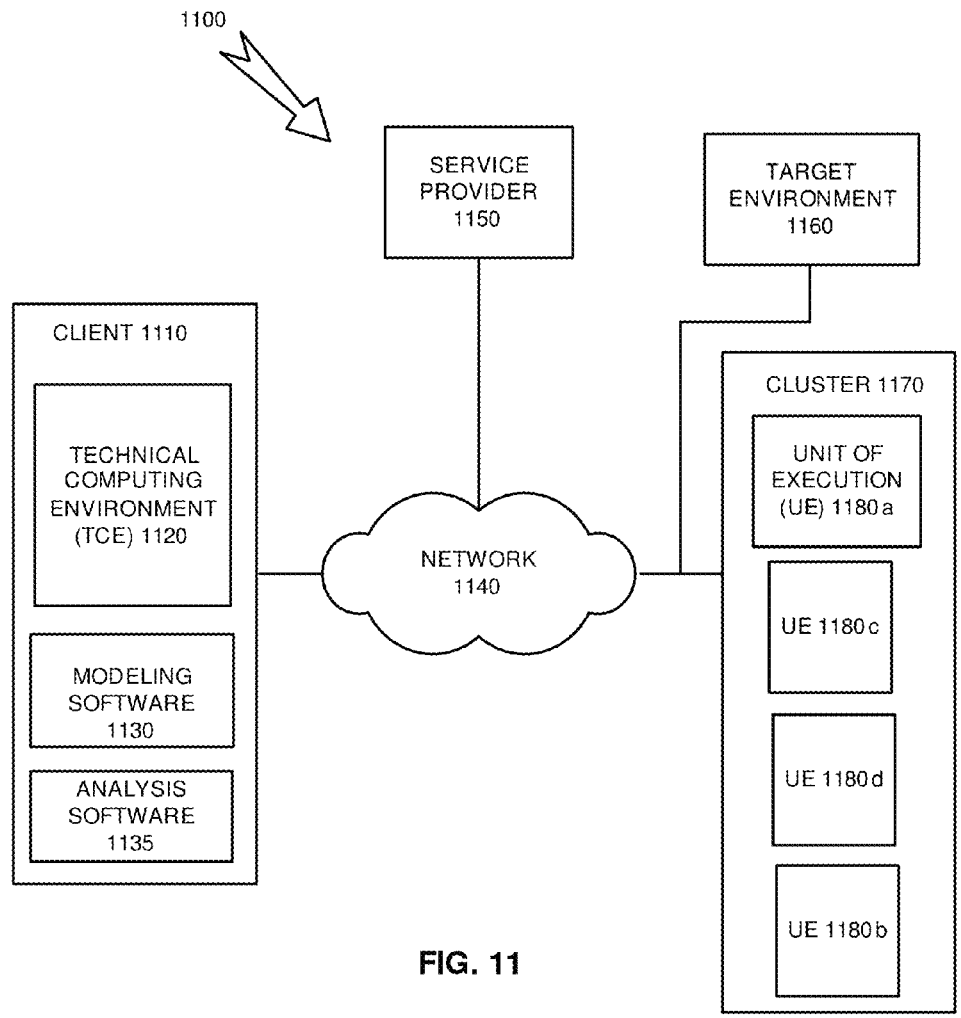
FIG. 11 illustrates a distributed environment that may be configured to practice an illustrative embodiment.

FIG. 11 illustrates distributed environment 1100 that may be configured to practice an illustrative embodiment. Referring to FIG. 11, environment 1100 may include a client 1110, network 1140, service provider 1150, target environment 1160 and cluster 1170. Note that the distributed environment illustrated in FIG. 11 is just one example of a distributed environment that may be used. Other distributed environments may include additional devices, fewer devices, or devices in arrangements that differ from the arrangement of environment 1100. For example, distributed environment 1100 can be implemented as a computing cloud if desired.

Client 1110 may include a device capable of sending and/or receiving information (e.g., data) to and/or from another device, such as target environment 1160. Information may include any type of machine-readable information having substantially any format that may be adapted for use, e.g., in one or more networks and/or with one or more devices. The information may include digital information and/or analog information. The information may further be packetized and/or non-packetized. In an embodiment, client 1110 may download data and/or code via network 1140. For example, client 1110 can download code for providing tactile and/or haptic feedback to a user consistent with aspects of the invention. For example, client 1110 may download code in order to implement user interface 160 and/or modeling environment 140.

Client 1110 may be, for example, a desktop computer, a laptop computer, a client computer, a server computer, a mainframe computer, a personal digital assistant (PDA), a web-enabled cellular telephone, a smart phone, smart sensor/actuator, or another computation or communication device that executes instructions that enable the device to perform one or more activities and/or generate one or more results.

In an illustrative embodiment, client 1110 may include a technical computing environment (TCE) 1120, modeling software 1130 and analysis software 1135. TCE 1120 may include a graphical block diagram environment that may be used to execute models and manipulate the models in accordance with techniques described herein. In other illustrative embodiments, client 1110 may include other components, applications, etc. Illustrative embodiments of TCE 1120 may include computer-executable instructions (e.g., code) and data that are configured to implement the TCE. The instructions may include instructions configured to implement graphical modeling software 1120 and/or graphical analysis software 1135. An example embodiment of the invention may be implemented by TCE 1120. For example, user interface 160 and modeling environment 140 may be an example of TCE 1120.

Modeling software 1130 and analysis software 1135 may be graphical, textual or a hybrid that includes both textual and graphical capabilities/features. Modeling software 1130 may include computer-executable instructions that allow, e.g., a user to build and/or execute a model. For example, modeling software 1130 may allow a user to build and execute a time-based model, a state-based model, an event-based model, a dataflow-based model, etc. As another example, modeling software 1130 may allow a user to build and/or execute a model based on class diagrams, object diagrams, activity diagrams, use case diagrams, scenario diagrams, requirements diagrams, physics based diagrams, truth tables, state transition matrices, etc. An example embodiment of the invention may be implemented as part of modeling software 1130. For instance, modeling environment 140 may be an example of a modeling software 1130.

Analysis software 1135 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an illustrative embodiment, analysis software 1135 may include the Simulink® Design Verifier™ software which is available from The MathWorks, Inc. An example embodiment of the invention may be implemented as part of analysis software 1135. Additionally, analysis software 1135 may be combined with modeling software 1130.

Network 1140 may include any network capable of exchanging information between entities associated with the network, including, for example, client 1110, service provider 1150, target environment 1160 and cluster 1170. Exchanged information may include, for example, packet data and/or non-packet data. Implementations of network 1140 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1140 may include various network devices, such as, for example, routers, switches, firewalls, servers, etc. Portions of network 1140 may be wired (e.g., using wired conductors, optical fibers, etc.) and/or wireless (e.g., free-space optical (FSO), radio frequency (RF), acoustic transmission paths, etc.). Portions of network 1140 may include a substantially open public network, such as the Internet. Portions of network 1140 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 1150 may include code (e.g., software), logic (e.g., hardware or a combination of hardware and software), etc., that makes a service available to another device in distributed environment 1100. Service provider 1150 may include a server operated by an entity (e.g., an individual, a corporation, an educational institution, a government agency, etc.) that provides one or more services to a destination, such as client 1110. The services may include software including computer-executable instructions that may be executed, in whole or in part, by a destination, by service provider 1150 on behalf of the destination, or some combination thereof. An example embodiment of the invention may be implemented as part of service provider 1150.

For example, in an illustrative embodiment, service provider 1150 may provide one or more subscription-based services to various customers via network 1140. These services may be accessed by the customer (e.g., via client 1110). Service provider 1150 may limit access to certain services based on, e.g., a customer service agreement between the customer and service provider 1150. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1160 may include a device that receives information from client 1110, service provider 1150, or cluster 1170. For example, target environment 1160 may receive executable code from client 1110, where the executable code allows target environment to perform an operation when the code is executed. Client 1110 may have generated the executable code using TCE 1120, modeling software 1130, and/or a code generator (not shown in FIG. 11).

Cluster 1170 may include a number of processing resources that perform processing on behalf of another device, such as client 1110, service provider 1150 and/or target environment 1160. Cluster 1170 may include logic that manages and/or coordinates the operation of multiple processing resources. For example, cluster 1170 may send data to and/or receive results from these processing resources. In an illustrative embodiment, cluster 1170 may include units of execution (UEs) 1180$a$, $b$, $c$, and $d$ (collectively UEs 1180) that may perform processing on behalf of client 1110 and/or another device, such as service provider 1150. An example embodiment of the invention may be implemented on one or more UEs 1180.

UEs 1180 may include hardware, software, or hybrid logic that perform processing operations on behalf of TCE 1120. For example, in an illustrative embodiment UEs 1180 may parallel process portions of a graphical model created by user of client 1110. This parallel processing may include performing analysis on the model, parsing the model into portions, and/or aggregating results from respective UEs 1180 into a single result for display to a user at client 1110. UEs 1180 may reside on a single device or chip or on multiple devices or chips. For example, UEs 1180 may be implemented in a single application specific integrated circuit (ASIC) or in multiple ASICs. Likewise, UEs 1180 can be implemented in a single computer system using virtualization techniques. Other examples of UEs 1180 may include field programmable gate arrays (FPGAs), complex programmable logic devices (CPLDs), application specific instruction-set processors (ASIPs), microprocessors, etc.

A TCE 1120 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the TCE 1120 may include a dynamically typed language that can be used to express problems and/or solutions in mathematical notations familiar to those of skill in the relevant arts. For example, the TCE 1120 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 1120 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 1120 may further provide mathematical functions and/or graphical tools (e.g., for creating plots, surfaces, images, volumetric representations, etc.). In one implementation, the TCE 1120 may provide these functions and/or tools using toolboxes (e.g., toolboxes for signal processing, image processing, data plotting, parallel processing, optimization, etc.). In another implementation, the TCE 1120 may provide these functions as block sets (e.g., an optimization block set). In still another implementation, the TCE 1120 may provide these functions in another way, such as via a library, etc. The TCE 1120 may be implemented as a text based environment, a graphically based environment, or another type of environment, such as a hybrid environment that is both textually and graphically based.

Illustrative Computing Architecture Example System

Figure 12:
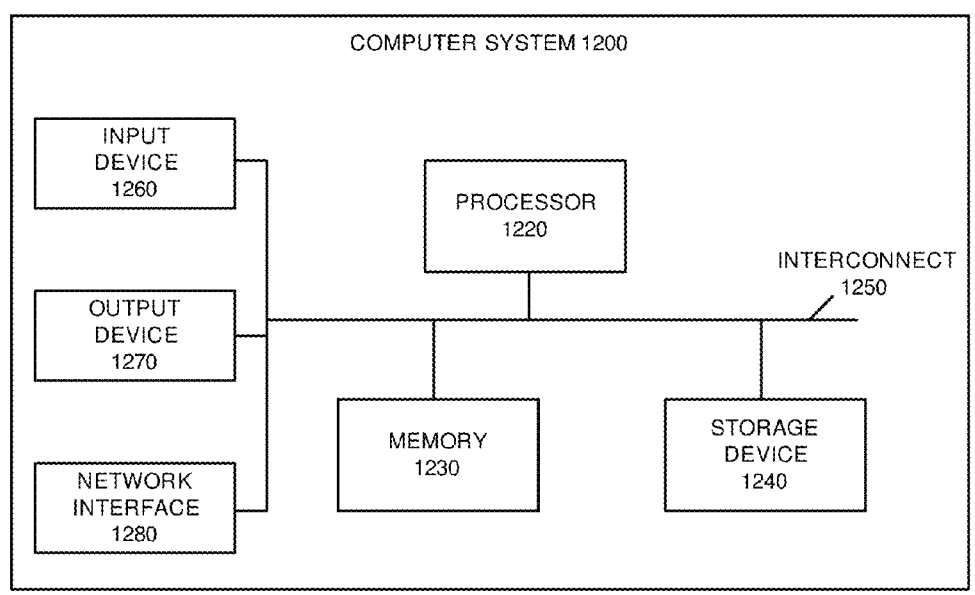
FIG. 12 illustrates an example of a computer system that may be configured to practice an embodiment of the invention.

FIG. 12 illustrates an example of a computer system 1200 that may be configured to practice an embodiment of the invention. For example, computer system 1200 may be used to implement user interface 160, modeling environment 120, display 110, input device 120, output device 130, client 1110, service provider 1150, target environment 1160, etc. Computer system 1200 may include a processor 1220, memory 1230, storage device 1240, input device 1260, output device 1270, and network interface 1280. Processor 1220 may include logic configured to execute computer-executable instructions that implement embodiments of the invention. For example, processor 120 may implement the process depicted in FIG. 2. An example of a processor that may be used with the invention includes the Pentium processor available from Intel Corporation, Santa, Clara, Calif. The instructions may reside in memory 1230 and may include instructions associated with implementing TCE 1120, user interface 160, and/or modeling environment 120.

Memory 1230 may be a computer-readable medium that may be configured to store instructions configured to implement embodiments of the invention. Memory 1230 may be a primary storage accessible to processor 1220 and can include a random-access memory (RAM) that may include RAM devices, such as, for example, Dynamic RAM (DRAM) devices, flash memory devices, Static RAM (SRAM) devices, etc. Storage device 1240 may include a magnetic disk and/or optical disk and its corresponding drive for storing information and/or instructions. Memory 1230 may be a tangible non-transitory computer-readable medium.

Interconnect 1250 may include logic that operatively couples components of computer system 1200 together. For example, interconnect 1250 may allow components to communicate with each other, may provide power to components of computer system 1200, etc. In an embodiment of computer system 1200, interconnect 1250 may be implemented as a bus.

Input device 1260 may include logic configured to receive information for computer system 1200 from, e.g., a user. In an exemplary embodiment, input device 120 may be an example of input device 1260. Output device 1270 may include logic configured to output information from computer system 1200. In an exemplary embodiment, display 110 and output device 130 may be an example of output device 1270.

Network interface 1280 may include logic configured to interface computer system 1200 with a network, e.g., network 1140, and may enable computer system 1200 to exchange information with other entities connected to the network, such as, for example, service provider 1150, target environment 1160 and cluster 1170. Network interface 1280 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1200 to any type of network.

It should be noted that embodiments may be implemented using some combination of hardware and/or software. It should be further noted that a computer-readable medium that includes computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an embodiment of the invention.

Alternative Illustrative Embodiments

An alternative illustrative embodiment may implement a TCE 1120, such as, for example, user interface 160 and/or modeling environment 140, using one or more text-based products. For example, a text-based TCE 1120, may be implemented using products/applications such as, but not limited to, C, C++, Basic, Fortran, Python, Java, applications by The MathWorks Inc., such as MATLAB®, and applications sold by other entities, such as Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim, etc.

Other illustrative embodiments may implement a TCE 1120, such as, for example, user interface 160 and/or modeling environment 140, in a graphically-based TCE 1120 using products/applications such as, but not limited to, applications by The MathWorks Inc., such as Simulink®; Stateflow®; SimEvents™; and SimMechanics, and applications sold by other entities, such as LabView® by National Instruments, Inc.; VisSim by Visual Solutions, Inc.; Dymola by Dynasim; SoftWIRE by Measurement Computing; WiT by DALSA Coreco; VEE Pro or SystemVue by Agilent; Vision Program Manager from PPT Vision; Khoros from Khoral Research;

Gedae by Gedae, Inc.; Scicos from The French National Institute for Research in Computer Science and Control (INRIA); Virtuoso from Cadence; Rational Rose from IBM; Rhopsody or Tau from Telelogic; Ptolemy from the University of California at Berkeley; aspects of a Unified Modeling Language (UML) or SysML environment; among others. An exemplary TCE 1120 may be two-dimensional (i.e. having only one plane), three-dimensional (i.e. having multiple planes), etc. An exemplary graphical TCE 1120 may also include computer aided design (CAD) tools such as CATIA® by Dassault Systèmes.

Another alternative illustrative embodiment may be implemented in a language that is compatible with a product that includes a TCE 1120, such as one or more of the above identified text-based or graphically-based TCE's 1120. For example, MATLAB® (a text-based TCE 1120) may use a first command to represent an array of data and a second command to transpose the array. Another product, that may or may not include a TCE 1120, may be MATLAB®-compatible and may be able to use the array command, the array transpose command, or other MATLAB® commands. For example, the other product may use the MATLAB® commands to suggest proper identifiers when an unrecognized identifier is presented.

Yet another alternative illustrative embodiment may be implemented in a hybrid TCE 1120 that combines features of a text-based and graphically-based TCE 1120. In one implementation, one TCE 1120 may operate on top of the other TCE 1120. For example, a text-based TCE 1120 (e.g., MATLAB®) may operate as a foundation and a graphically-based TCE 1120 (e.g., Simulink) may operate on top of MATLAB® and may take advantage of text-based features (e.g., commands) to provide a user with a graphical user interface and graphical outputs (e.g., graphical displays for data, dashboards, etc.).

Another alternative illustrative embodiment may be implemented in a language that is compatible with a product that includes a TCE 1120, such as one or more of the above identified text-based or graphically-based TCE's 1120. For example, MATLAB® (a text-based TCE 1120) may use a first command to represent an array of data and a second command to transpose the array. Another product, that may or may not include a TCE 1120, may be MATLAB®-compatible and may be able to use the array command, the array transpose command, or other MATLAB® commands. For example, the other product may use the MATLAB® commands to assist in display the resultant of a series of data points as a spline.

Yet another alternative illustrative embodiment may be implemented in a hybrid TCE 1120 that combines features of a text-based and graphically-based TCE 1120. In one implementation, one TCE 1120 may operate on top of the other TCE 1120. For example, a text-based TCE 1120 (e.g., MATLAB®) may operate as a foundation and a graphically-based TCE 1120 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that provide tactile and/or haptic feedback to a user.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 2 and 3, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1, 11, and 12 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The scope of the invention is defined by the claims and their equivalents.

What is claimed is:
1. A computer-implemented modeling system comprising:
 a storage medium storing executable instructions to:
  provide a modeling environment using the system, the modeling environment configured to provide for development of one or more models using a plurality of model elements, the one or more models being one or more of: a time-based model, an event-based model, a state-based model, a dataflow-based model, a model in a dynamically typed language or an array-based language, or a model based on class diagrams, object diagrams, activity diagrams, use case diagrams, scenario diagrams, requirements diagrams, physics based diagrams, truth tables, or state transition matrices;
  interact with a model in the modeling environment;
  receive a first input instruction to add one or more model elements of the plurality of model elements to the model;
  receive a second input instruction and create an executable input instruction, where the executable input instruction represents the second input instruction and instructs the modeling environment to perform one or more of:
   an analyzing operation to generate, output, or manipulate the added one or more model elements,
   an editing operation to alter the modeling environment or to alter the model, or
   a navigating operation to change a manner in which all or part of the model is displayed;

an output device to:
output at least one of:
a tactile output representing tactile feedback, the tactile feedback being based on results of the one or more operations, or
a haptic output representing haptic feedback, the haptic feedback being based on results of the one or more operations; and
a processor to:
execute the executable instructions to provide the modeling environment,
process the executable input instruction using the modeling environment, and
generate an output instruction based on processing the executable input instruction, where the output instruction is used by an output device for generating the tactile output or the haptic output.

2. The system of claim 1, wherein the second input instruction is received in connection with at least one of a model, a model configuration option, the modeling environment, or a result of an executed model.

3. The system of claim 1, wherein the processor receives a third input instruction and creates a second executable input instruction, where the second executable input instruction represents the third input instruction and instructs the modeling environment to perform one or more of:
an analyzing operation,
an editing operation, or
a navigating operation,
wherein the output device outputs at least one of:
a second tactile output representing tactile feedback, or
a second haptic output representing haptic feedback, and
wherein the second executable input instruction is different than the executable input instruction.

4. A computer-implemented system comprising:
a storage medium to:
store executable instructions for providing a modeling environment using the system, the modeling environment configured to provide for development of one or more models using a plurality of model elements, the one or more models being one or more of: a time-based model, an event-based model, a state-based model, a dataflow-based model, a model in a dynamically typed language or an array-based language, or a model based on class diagrams, object diagrams, activity diagrams, use case diagrams, scenario diagrams, requirements diagrams, physics based diagrams, truth tables, or state transition matrices;
a processor to:
execute the executable instructions to provide the modeling environment,
interact with a model in the modeling environment,
receive a first input instruction to add one or more model elements of the plurality of model elements to the model,
receive a second input instruction and create an executable input instruction, where the executable input instruction represents the second input instruction and instructs the modeling environment to perform one or more of:
an analyzing operation to generate, output, or manipulate the added one or more model elements,
an editing operation to alter the modeling environment or to alter the model, or
a navigating operation to change a manner in which all or part of the model is displayed, and
generate an output instruction based on the executable input instruction, the output instruction being utilized by an output device to generate at least one of:
a tactile output representing tactile feedback, the tactile feedback being based on results of the one or more operations, or
a haptic output representing haptic feedback, the haptic feedback being based on results of the one or more operations.

5. The system of claim 4, wherein the first input instruction is received in connection with at least one of a graphical model or a textual model.

6. The system of claim 4, wherein the second input instruction is received in connection with at least one of a model, a model configuration option, a model development environment option, or a result of an executed model.

7. The system of claim 4, wherein the tactile output is a texture that resembles a material, wherein the material is at least one of, metal, sandpaper, ice, fur, silk, jeans, viscous liquid, and non-viscous liquid.

8. The system of claim 4, wherein the haptic output is at least one of an electric pulse, magnetic pulse, a pneumatic pulse, or a mechanical pulse.

9. The system of claim 4, wherein the processor further processes a third input instruction and creates a second executable input instruction, where the second executable input instruction represents the third input instruction and instructs the modeling environment to perform one or more of:
an analyzing operation,
an editing operation, or
a navigating operation, and
generate a second output instruction based on the second executable input instruction, the second output instruction being utilized by the output device to generate at least one of:
a second tactile output representing tactile feedback, or
a second haptic output representing haptic feedback.

10. The system of claim 4, wherein the tactile output or the haptic output is user selectable.

11. A computer-implemented method for modeling comprising:
providing a modeling environment, the modeling environment configured to provide for development of one or more models using a plurality of model elements, the one or more models being one or more of: a time-based model, an event-based model, a state-based model, a dataflow-based model, a model in a dynamically typed language or an array-based language, or a model based on class diagrams, object diagrams, activity diagrams, use case diagrams, scenario diagrams, requirements diagrams, physics based diagrams, truth tables, or state transition matrices;
interacting with a model in the modeling environment;
adding one or more model elements of the plurality of model elements to the model;
receiving an input instruction;
creating an executable input instruction, where the executable input instruction represents the input instruction and instructs the modeling environment to perform one or more of:
an analyzing operation to generate, output, or manipulate information related to the model or results of executing the model,
an editing operation to alter the modeling environment or to alter the model, or a navigating operation to change a manner in which all or part of the model is displayed; and generating an output instruction based on the executable input instruction, the output instruction being utilized by an output device to generate at least one of:

a tactile output representing tactile feedback, the tactile feedback being based on results of the one or more operations, or a haptic output representing haptic feedback, the haptic feedback being based on results of the one or more operations.

12. The method of claim 11, wherein the input instruction is received in connection with at least one of the model, a model configuration option, a model development environment option, or a result of an executed model.

13. The method of claim 11, wherein the input instruction is received in connection with at least one of a graphical model or a textual model.

14. The method of claim 11, wherein the tactile output is a texture that resembles a material, wherein the material is at least one of metal, sandpaper, ice, fur, silk, jeans, viscous liquid, or non-viscous liquid.

15. The method of claim 11, wherein the haptic output is at least one of an electric pulse, magnetic pulse, a pneumatic pulse, or a mechanical pulse.

16. The method of claim 11, wherein the tactile output or the haptic output is user selectable.

17. A computer-implemented method, the method comprising:

downloading software to a computer system, which when executed by the computer system causes the computer system to perform operations comprising the method of claim 11; or providing downloadable software to a computer system, which when executed by the computer system causes the computer system to perform operations comprising the method of claim 11.

18. A computer-implemented method, the method comprising:

performing the method of claim 11 in a distributed environment.

19. One or more tangible non-transitory computer-readable media holding computer-executable instructions for operating a modeling environment using a computer, the media holding one or more instructions for:

providing a modeling environment, the modeling environment configured to provide for development of one or more models using a plurality of model elements, the one or more models being one or more of: a time-based model, an event-based model, a state-based model, a dataflow-based model, a model in a dynamically typed language or an array-based language, or a model based on class diagrams, object diagrams, activity diagrams, use case diagrams, scenario diagrams, requirements diagrams, physics based diagrams, truth tables, or state transition matrices;

interacting with a model in the modeling environment;

adding one or more model elements of the plurality of model elements to the model;

receiving an input instruction;

creating an executable input instruction, where the executable input instruction represents the input instruction and instructs the modeling environment to perform one or more of:

an analyzing operation to generate, output, or manipulate information related to the model or results of executing the model, an editing operation to alter the modeling environment or to alter the model, or a navigating operation to change a manner in which all or part of the model is displayed; and generating an output instruction based on the executable input instruction, the output instruction being utilized by an output device to generate at least one of:

a tactile output representing tactile feedback, the tactile feedback being based on results of the one or more operations, or a haptic output representing haptic feedback, the haptic feedback being based on results of the one or more operations.

20. The media of claim 19, further comprising one or more instructions for:

receiving a second input instruction;

creating a second executable input instruction, where the second executable input instruction represents the second input instruction and instructs the modeling environment to perform one or more of:

an analyzing operation, an editing operation, or a navigating operation; and generating a second output instruction based on the second executable input instruction, the second output instruction being utilized by an output device to generate at least one of:

a second tactile output representing tactile feedback, or a second haptic output representing haptic feedback, and wherein the second executable input instruction is different than the executable input instruction.

21. One or more tangible non-transitory computer-readable media holding computer-executable instructions for operating a modeling environment using a computer, the media holding one or more instructions for:

downloading the instructions of claim 19 to a computer system, which when executed by the computer system causes the computer system to perform operations comprising the downloaded instructions; or providing downloadable software to a computer system, which when executed by the computer system causes the computer system to perform the operations of claim 19.

22. One or more tangible non-transitory computer-readable media holding computer-executable instructions for operating a modeling environment using a distributed environment, the media holding one or more instructions for:

performing the instructions of claim 19 in a distributed environment.

23. The media of claim 19, wherein the input instruction is received in connection with at least one of the model, a model configuration option, a model development environment option, or a result of an executed model.

24. The media of claim 19, wherein the model is a graphical model or a textual model.

25. The media of claim 19, wherein the plurality of model elements comprises a first element and a second element, wherein the input instruction aligns a first portion of the first model element with a second portion of the second model element.

26. The media of claim 25, wherein the first portion of the first model element is a model element interface of the first model element, a model element geometry of the first model element, or a line feature of a line coupled to the first model element;

wherein the second portion of the second model element is:

a model element interface of the second model element, a model element geometry of the second model element, or a line feature of a line coupled to the second model element.

27. The media of claim 19, further comprising one or more instructions for:
   executing the model in the modeling environment; and
   displaying the results of the executed model, wherein the displayed results include one of: a trace, a plot, or a spline.

\* \* \* \* \*